United States Patent
Tsukima et al.

(10) Patent No.: US 8,803,457 B2
(45) Date of Patent: Aug. 12, 2014

(54) AC MOTOR DRIVE CONTROL DEVICE

(75) Inventors: Mitsuru Tsukima, Chiyoda-ku (JP); Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 296 days.

(21) Appl. No.: 13/504,035

(22) PCT Filed: Dec. 28, 2009

(86) PCT No.: PCT/JP2009/071758
§ 371 (c)(1),
(2), (4) Date: Apr. 25, 2012

(87) PCT Pub. No.: WO2011/080823
PCT Pub. Date: Jul. 7, 2011

(65) Prior Publication Data
US 2012/0212168 A1  Aug. 23, 2012

(51) Int. Cl.
| | | |
|---|---|---|
| *H02P 6/14* | (2006.01) |
| *B60L 9/18* | (2006.01) |
| *H02P 27/06* | (2006.01) |
| *B60L 3/04* | (2006.01) |
| *B60L 15/02* | (2006.01) |
| *B60L 3/00* | (2006.01) |
| *H01H 47/00* | (2006.01) |
| *H01H 33/666* | (2006.01) |

(52) U.S. Cl.
CPC .............. *H02P 27/06* (2013.01); *B06L 3/0084* (2013.01); *B06L 2200/26* (2013.01); *B06L 3/003* (2013.01); *H01H 47/002* (2013.01); *B60L 9/18* (2013.01); *B60L 3/04* (2013.01); *H01H 33/6662* (2013.01); *B60L 2240/525* (2013.01); *B60L 15/025* (2013.01); *B60L 2210/40* (2013.01); *B60L 2220/14* (2013.01); *Y02T 10/7241* (2013.01); *Y02T 10/643* (2013.01); *B60L 3/0069* (2013.01)

USPC .................. 318/400.26; 318/801; 318/400.21; 318/400.22

(58) Field of Classification Search
CPC ........................................................ H02P 29/021
USPC .................. 318/400.26, 801, 400.21, 400.22
See application file for complete search history.

(56) References Cited

U.S. PATENT DOCUMENTS 5,196,656 A * 3/1993 Mizuno et al. ................ 187/314
5,528,443 A   6/1996 Itoga et al.

(Continued)

FOREIGN PATENT DOCUMENTS

| EP | 2 075 907 A1 | 7/2009 |
| JP | 8-182105 A | 7/1996 |

(Continued)

OTHER PUBLICATIONS

International Search Report (PCT/ISA/210) issued on Apr. 6, 2010, by Japanese Patent Office as the International Searching Authority for International Application No. PCT/JP2009/071758.

(Continued)

*Primary Examiner* — Erick Glass
(74) *Attorney, Agent, or Firm* — Buchanan Ingersoll & Rooney PC

(57) ABSTRACT

An AC motor drive control device including: an inverter, having a plurality of switching elements subjected to on-off control, for converting a DC voltage to an AC voltage with a desired frequency to drive an AC motor; a motor opening contactor connected between the inverter and the AC motor; a switching operation beforehand detection unit for detecting a switching operation of the motor opening contactor prior to the contact or detach of main contacts and outputting a switching operation beforehand detection signal; and a control unit having an inverter control unit for performing the on-off control for the plurality of switching elements and switching control for the motor opening contactor, and controlling the inverter based on the switching operation beforehand detection signal.

20 Claims, 8 Drawing Sheets

(56) References Cited

U.S. PATENT DOCUMENTS

| | | | |
|---|---|---|---|
| 8,049,455 B2 * | 11/2011 | Kitanaka | 318/563 |
| 8,228,008 B2 * | 7/2012 | Kitanaka | 318/45 |
| 8,559,143 B2 * | 10/2013 | Yasuoka et al. | 361/42 |
| 8,598,837 B2 * | 12/2013 | Kitanaka et al. | 318/801 |
| 2010/0079093 A1 | 4/2010 | Kitanaka | |
| 2010/0171448 A1 | 7/2010 | Kitanaka | |
| 2010/0289439 A1 | 11/2010 | Kitanaka et al. | |
| 2012/0019183 A1 * | 1/2012 | Sakane et al. | 318/473 |

FOREIGN PATENT DOCUMENTS

| | | | |
|---|---|---|---|
| JP | 9-46813 A | 2/1997 | |
| JP | 2008-79496 A | 4/2008 | |
| JP | 4316005 B1 | 8/2009 | |
| KR | 10-1995-0015995 A | 6/1995 | |
| KR | 10-2004-0076376 A | 9/2004 | |
| WO | 2008-149447 A1 | 12/2008 | |
| WO | WO 2009/107233 A1 | 9/2009 | |
| WO | WO 2009/125683 A1 | 10/2009 | |

OTHER PUBLICATIONS

Written Opinion (PCT/ISA/237) issued on Apr. 6, 2010, by Japanese Patent Office as the International Searching Authority for International Application No. PCT/JP2009/071758.

English Translation of Office Action from JP Application No. 2011-506522 issued Apr. 5, 2011.

Korean Office Action (Notification of Preliminary Rejection) dated May 30, 2013, issued by the Korean Patent Office in corresponding Korean Patent Application No. 10-2012-7011495 and English language translation. (6 pages).

European Search Report issued on Jun. 3, 2013, by the European Patent Office in corresponding European Patent Application No. 09852801.1-1809 / 2521255. (5 pages).

Office Action issued on Mar. 27, 2014, by the Chinese Patent Office in corresponding Chinese Patent Application No. 200980163210.X, and an English Translation of the Office Action. (24 pages).

* cited by examiner

-307.20 μs                    192.80 μs

AC MOTOR DRIVE CONTROL DEVICE

FIELD

The present invention relates to an AC motor drive control device suitable for driving a permanent magnet synchronous motor equipped in electric vehicles.

BACKGROUND

A permanent magnet synchronous motor has been known as a highly efficient motor as compared to an induction motor which has been widely used conventionally in various fields, and an application thereof for driving an automobile or an electric train has been studied in recent years. In an electric vehicle running with a plurality of vehicles, each equipped with such an AC motor and a motor drive control device, being connected together, even if a motor drive control device in part of the vehicles has a failure while running and part of the motors therefore cannot be operated, the electric vehicle can be kept running by other sound AC motor drive control devices and motors. Note however that since the motor connected to the broken AC motor drive control device is kept driven from the wheel side thereof, a short-circuit current due to an induced voltage of the motor is kept flowing through the failure part (short-circuited part) in the AC motor drive control device having a short-circuit fault.

As a method for dealing with a failure in an inverter within an AC motor drive control device for controlling the drive of a permanent magnet synchronous motor while an electric vehicle is running as described above, Patent Literature 1 below, for example, discloses a method in which a motor opening contactor for electrically disconnecting between the inverter and the motor is provided so as to prevent a damage to the inverter due to the induced voltage of the motor from being expanded and if a control unit detects a failure in the inverter, the control unit performs open-circuit control for this contactor so as to electrically disconnect between the inverter and the motor.

Also, as an opening contactor, Patent Literature 2 below mentions a vacuum contactor having a high cutoff performance. Furthermore, Patent Literature 2 discloses a method in which ferrites are disposed on an upstream side and a downstream side of the contactor so as to limit a pre-arc phenomenon or a closing surge voltage between contacts when the vacuum contactor is closed.

PATENT LITERATURE

Patent Literature 1: Japanese Patent Application Laid-open No. H8-182105
Patent Literature 2: Japanese Patent Application Laid-open No. 2008-79496

SUMMARY

Technical Problem

Typically, the motor opening contactor is designed to be opened and closed under no voltage condition, and has a sequence such that the gate-off of an inverter is performed first and a closing command to the contactor is then turned OFF, or a closing command to the contactor is turned ON while the gate-off of the inverter is being performed. However, if the contactor malfunctions (disconnection of a control line to the contactor, or malfunction due to other unexpected causes), there are possibly cases where the contactor operates contrary to the above-described closing command. Particularly, if the contactor is turned ON while the gate-on of the inverter is being performed, there is a possibility of generating a closing surge (surge voltage) specific to vacuum contacts. As characteristics of the vacuum contacts, they have a cutoff performance covering up to a high frequency domain (hundreds of kilohertz) as compared to other contacts in gas or in oil. When vacuum contacts, to which a voltage is being applied, are made to perform a closing operation, a dielectric breakdown is caused as a distance between the contacts is reduced, resulting in the generation of pre-arc. Although a high-frequency current is thereby flowed therethrough, the pre-arc is cut off due to the rapid dielectric recovery force in vacuum, and a transient recovery voltage involved with the cutoff is generated. Due to an increase in this transient recovery voltage, the process of dielectric breakdown and cutoff of the high-frequency current is repeated again until the contacts are mechanically contacted with each other. The thus generated surge voltage sometimes reaches to a level of several kilovolts to tens of kilovolts, possibly resulting in dielectric breakdown in components inside the motor or the drive control device. Thus, the surge voltage value needs to be suppressed low.

Patent Literature 2 mentioned above uses ferrite cores in order to suppress surges, and the ferrite cores are disposed in each of three phases of the vacuum contacts and around both of conductors on the upstream side and the downstream side of the vacuum contacts. However, a space for disposing six ferrite cores is required within an AC motor drive control device per one motor. Thus, if one powered vehicle carries four to six motors, the total number of ferrite cores to be disposed within the drive control device for drive-controlling those motors is 24 to 36, thereby resulting in a large drive control device. An increase in the size or the weight of the drive control device as described above results in an increase in the manufacturing cost or deterioration in the energy efficiency during the running thereof. Furthermore, core overheating due to an eddy current induced on the surface of the ferrite core by a high-frequency component of a flowing current can be presumed as a problem to be solved.

The present invention has been made in view of the above, and an object thereof is to obtain an AC motor drive control device capable of avoiding the generation of a harmful switching surge involved with the switching of a motor opening contactor.

Solution to Problem

In order to solve above-mentioned problems and achieve the object of the present invention, there is provided an AC motor drive control device including an inverter, including a plurality of switching elements subjected to on-off control, for converting a DC voltage to an AC voltage with a desired frequency to drive an AC motor, a motor side switching unit connected between the inverter and the AC motor, a switching operation beforehand detection unit for detecting a switching operation of the motor side switching unit prior to contact or detach of main contacts and outputting a switching operation beforehand detection signal, and a control unit having an inverter control unit for performing the on-off control for the plurality of switching elements and controlling the inverter based on the switching operation beforehand detection signal.

Advantageous Effects of Invention

According to this invention, if a motor opening contactor malfunctions due to some sort of reason while an inverter is in operation, the operation of the motor opening contactor (switching operation (contact or detach)) is detected in advance before the motor opening contactor cuts off or makes a current, and the inverter is controlled so as to prevent an on-off voltage (a voltage changing in a pulsed form) of the inverter from being applied between the main contacts of the motor switching unit. Thus, there is obtained an advantageous effect of being able to avoid the generation of a harmful switching surge involved with the switching of the motor opening contactor.

BRIEF DESCRIPTION OF DRAWINGS

FIG. 12 shows an exemplary configuration of a switching operation beforehand detection unit for monitoring a displacement in an electromagnet or the like.

DESCRIPTION OF EMBODIMENTS

Embodiments of a AC motor drive control device according to the present invention will be described in detail with reference to the drawings. Note that the present invention is not limited by these embodiments.

First Embodiment

Figure 1:
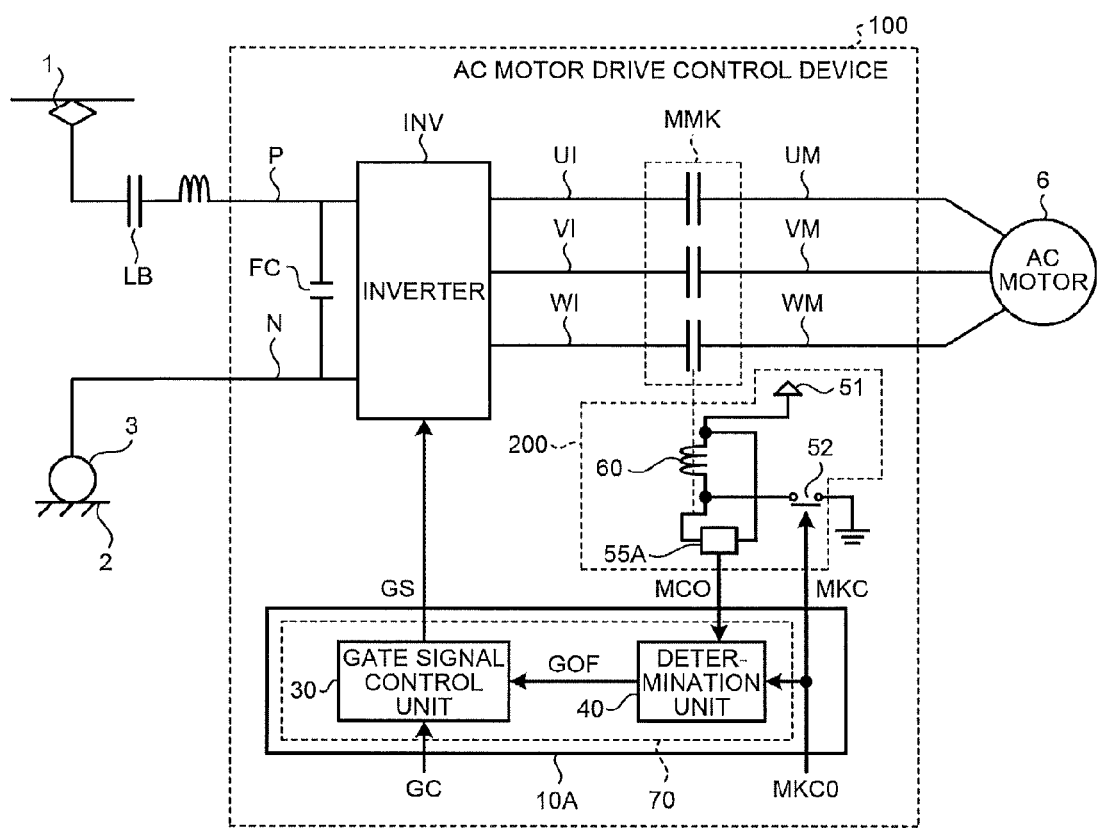
FIG. 1 is a diagram showing an exemplary configuration of an AC motor drive control device and relevant devices connected thereto in a first or second embodiment of the present invention.

FIG. 1 is a diagram showing an exemplary configuration of an AC motor drive control device 100 and relevant devices connected thereto in the first or second embodiment of the present invention. Specifically, a power collector 1 for receiving power while being in contact with an overhead wire; a wheel 3 for driving an electric vehicle while being in contact with a rail 2; the AC motor drive control device 100 and an AC motor 6 are shown in FIG. 1. The AC motor drive control device 100 shown in FIG. 1 is configured to include, as main components: a power source opening contactor LB as a power source side switching unit for receiving power from the power collector 1 and for switching a power source side main circuit; an inverter INV for performing power conversion from a DC power received via a positive side conductor P and a negative side conductor N to an AC power; a capacitor FC whose both ends are connected to the positive side conductor P and the negative side conductor N; an inverter side U-phase conductor UI, an inverter side V-phase conductor VI, and an inverter side W-phase conductor WI for transmitting the AC power converted in the inverter INV to a load; a motor opening contactor MMK as a motor side switching unit capable of disconnecting an output of the inverter INV; an MMK operating unit 200 for performing an opening operation or a closing operation of the motor opening contactor MMK; and a control unit 10A for mainly controlling the inverter INV and the motor opening contactor MMK. The AC motor 6 is connected to the drive control device 100 via a motor side U-phase conductor UM, a motor side V-phase conductor VM, and a motor side W-phase conductor WM.

Figure 2:
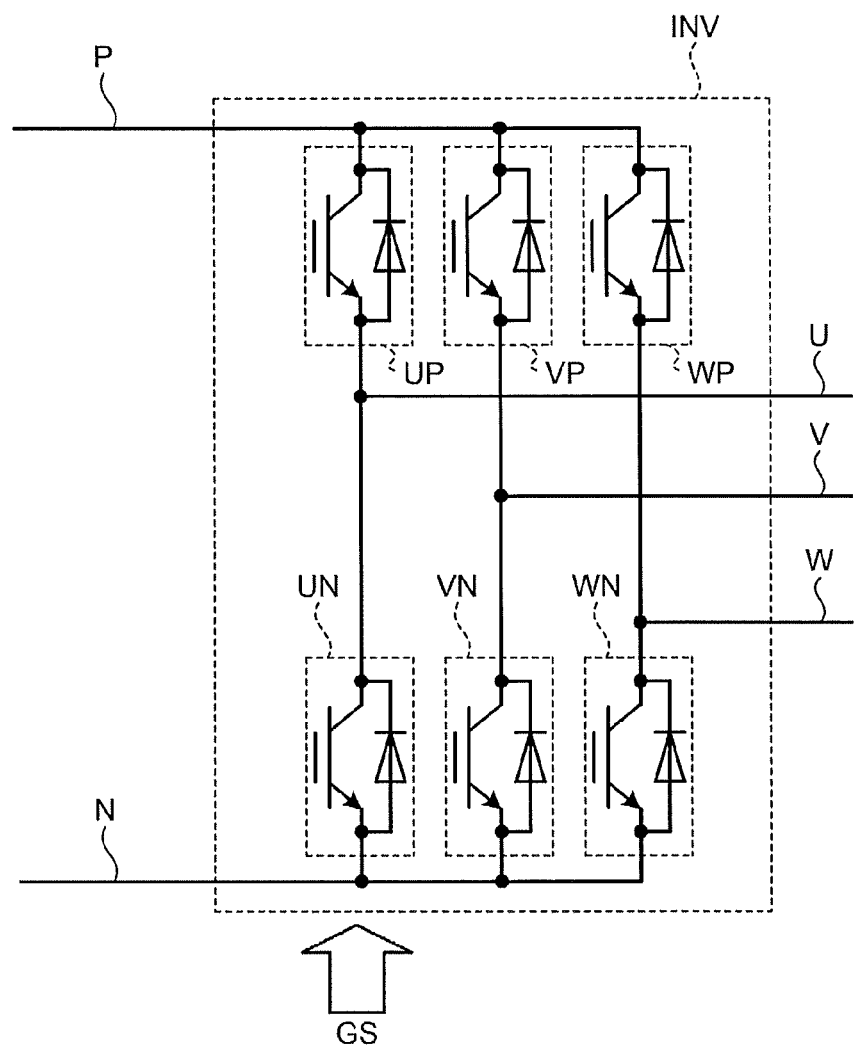
FIG. 2 is a diagram showing an exemplary configuration of an inverter in the first embodiment of the present invention.

FIG. 2 is a diagram showing an exemplary configuration of the inverter INV. As shown in FIG. 2, the inverter INV is formed as what is called a three-phase two-level inverter circuit, and is structured as a bridge circuit consisting of six switching elements, i.e., a U-phase upper arm element UP, a V-phase upper arm element VP, and a W-phase upper arm element WP as positive side arm switching elements connected to the positive side conductor P, and a U-phase lower arm element UN, a V-phase lower arm element VN, and a W-phase lower arm element WN as negative side arm switching elements connected to the negative side conductor N. The inverter side U-phase conductor UI, the inverter side V-phase conductor VI, and the inverter side W-phase conductor WI are connected to connecting points between the upper arm elements and the lower arm elements on the respective phases, respectively. As shown in FIG. 2, each of the switching elements is formed by an IGBT element and a diode element connected in inverse-parallel. Note that a preferable structure of the inverter INV is a voltage PWM inverter. Alternatively, the inverter INV may be a multilevel inverter circuit such as a three-level inverter circuit, and the switching element may be formed by an element other than the IGBT element. On-off control (switching control) is performed on each of the switching elements based on a gate signal GS outputted from the control unit 10A to be described later. Although not shown in the figure, the power source opening contactor LB is opened or closed (turned OFF or ON) by the control unit 10A or a system control unit whose order is higher than the control unit 10A and which is not shown in the figure. Note that the gate signal GS can be regarded as a representative example of an individual on-off signal for each of the elements UP to WN or as a signal for collectively controlling the on-off control of the elements UP to WN to an ON state or OFF state.

In FIG. 1, the motor opening contactor MMK is a contactor capable of cutting off an alternating current, and is connected between the inverter INV and the AC motor 6. Since a current zero point occurs once every half cycle of a current waveform in an alternating current, the current is cut off at this current zero point.

Figure 3:
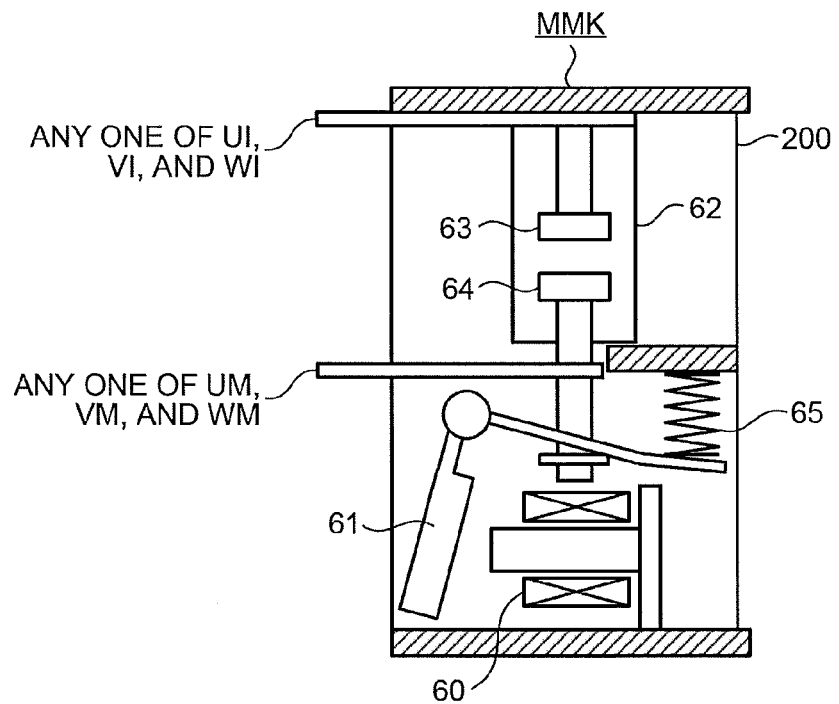
FIG. 3 is a diagram for explaining an MMK operating unit for operating a motor opening contactor shown in FIG. 1.
Figure 4:
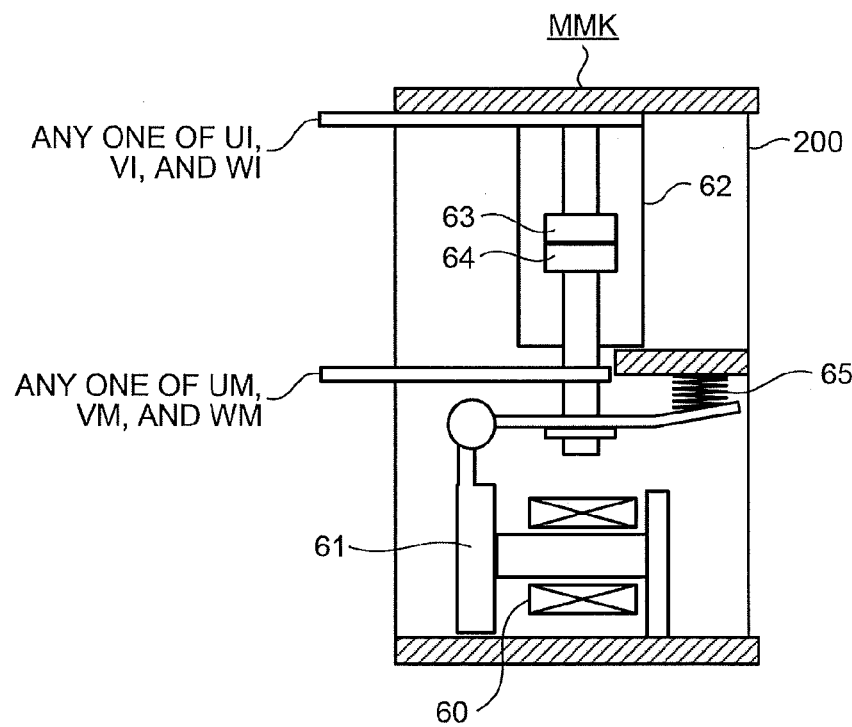
FIG. 4 is a diagram showing the motor opening contactor MMK and the MMK operating unit in which contacts are closed.

FIG. 3 is a diagram for explaining an MMK operating unit for operating the motor opening contactor MMK shown in FIG. 1, and FIG. 4 is a diagram showing the motor opening contactor MMK and the MMK operating unit in which contacts are closed. The motor opening contactor MMK is formed by an vacuum interrupter 62 having therein a pair of a moving contact 64 and a fixed contact 63; and an operating electromagnet for operating the switching of this moving contact 64. If a switching command MKC from the control unit 10A is turned ON, a coil 60 of the operating electromagnet in the opening contactor MMK is excited, thereby attracting an armature 61. As a result, the moving contact 64 in engagement with the armature 61 is driven upwardly. Thus, the contacts are closed as shown in FIG. 4, thereby connecting the conductor UM (or VM or WM) and the conductor UI (or VI or WI) so as to electrically connect the inverter INV and the AC motor 6. On the other hand, an opening spring 65 is being compressed in FIG. 4, and if the switching command MKC is turned OFF, the coil 60 is no longer excited, thereby lowering an attractive force on the armature 61. As a result, the moving contact 64 is driven downwardly by the load of the opening spring 65, thereby opening the contacts. Thus, the main contacts are turned OFF, thereby electrically disconnecting between the inverter INV and the AC motor 6.

Note that although FIGS. 3 and 4 showing the opening contactor MMK are single-phase structure diagrams, a three-phase device can be formed by disposing three identical structures in parallel. The electromagnet may be provided individually for each of the phases, or a mechanical connection can be made so that one electromagnet collectively drives three-phase contacts. Moreover, the configuration of FIG. 3 or FIG. 4 is merely an example, and a fundamental function does not change even if the layout of the coil 60 or the vacuum interrupter 62 is changed in order to downsize the outer shape of the motor opening contactor (hereinafter, referred to simply as a "contactor") MMK. Moreover, although FIGS. 3 and 4 show a case of a constantly-excited contactor, it may be a latch type contactor having a mechanism for maintaining a closed state. In such a case, an opening coil for releasing a latch may be provided and an opening operation may be performed by exciting the opening coil. The AC motor 6 is connected at a subsequent stage of the contactor MMK via the motor side U-phase conductor UM, the motor side V-phase conductor VM, and the motor side W-phase conductor WM, and the wheels 3 mechanically connected to the AC motor 6 are rotated to drive the electric vehicle. Note that although the AC motor 6 is assumed to be a permanent magnet synchronous motor as described above, the present invention is also effective to those other than a motor having a permanent magnet contained in a rotor (for example, an induction motor or the like).

Figure 5:
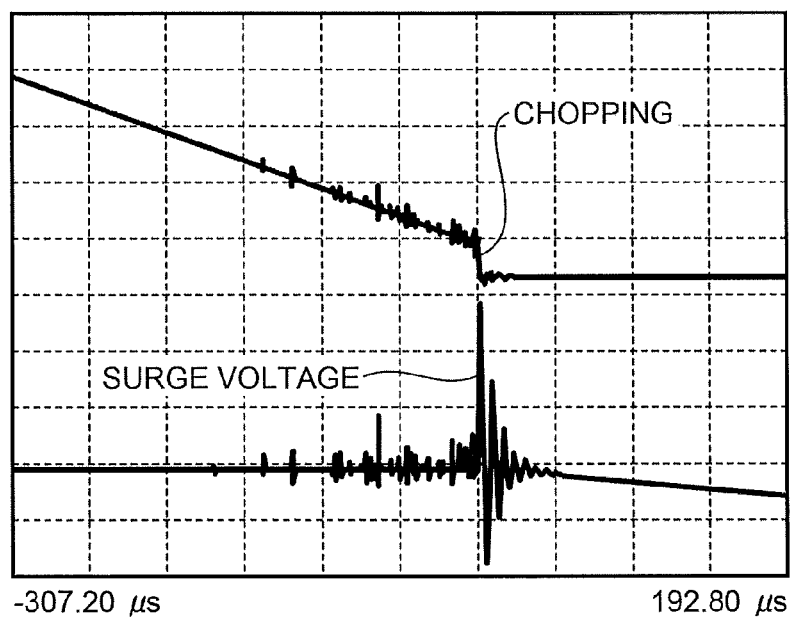
FIG. 5 is a graph showing a chopping surge waveform of a vacuum contactor.

By the way, there are two kinds of switching surges relating to vacuum contacts, i.e., a closing surge and an opening surge. The opening surge is a phenomenon generated by the action in which the cutting off of an alternating current is not performed at a current zero point, and the current is rapidly cut off (=chopped) before the current zero point as shown in FIG. 5. It has been known that the magnitude Vs of a surge voltage generated at this point is represented as $Vs=\sqrt{(L/C)} \cdot Ic$. Here, Ic denotes a chopping current level; L denotes a circuit inductance component; and C denotes a circuit capacitor component. That is, a small chopping current level Ic implies that the generated chopping surge is insignificantly small. It has been known that this chopping current level Ic depends on a contact material for the vacuum contacts. In a typical vacuum contact type opening contactor, a preferable contact material is selected, and the chopping current level Ic is therefore small. Thus, the level of the surge voltage Vs is insignificant.

However, since a typical vacuum type opening contactor is assumed to be applied in an AC circuit (a circuit formed by a commercial frequency sine wave AC power source, referred to simply as an AC circuit hereinafter) in a distributing substation system of a medium voltage class (3.3 kV to 33 kV), the typical vacuum type opening contactor has not been designed for use in an AC circuit controlled by an inverter (hereinafter, referred to as an "inverter circuit").

Figure 6:
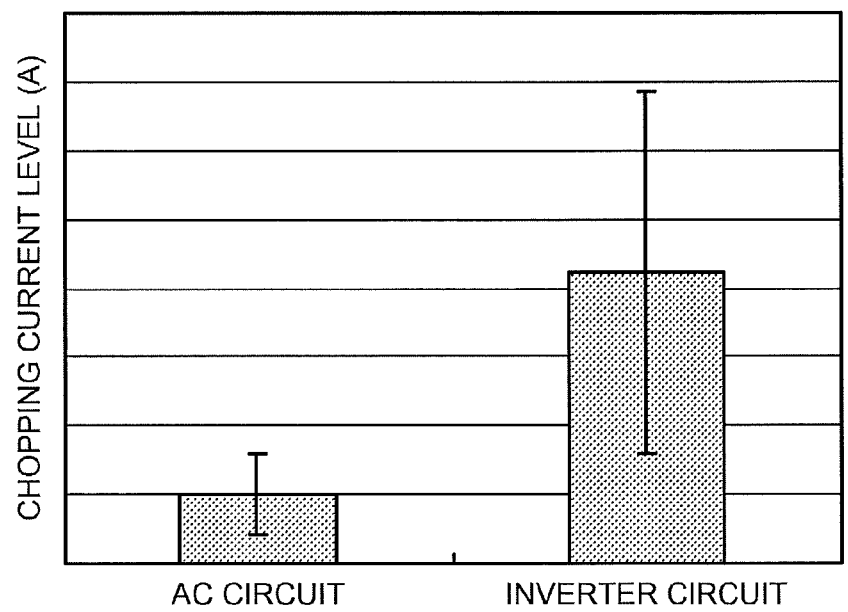
FIG. 6 is a graph of actual measurements showing a difference between a chopping current level in an AC circuit and that in an inverter circuit.

FIG. 6 is a graph of actual measurements showing a difference between a chopping current level IC in an AC circuit and that in an inverter circuit. This graph of actual measurements shows a result of an experiment conducted by the present inventors. From the result of FIG. 6, when compared with the chopping current level Ic in the AC circuit, it was newly discovered that the chopping current level Ic in the inverter circuit was increased about four times of the chopping current level Ic in the AC circuit. While the inverter circuit generates an AC output by switching (on-off switching) the plurality of switching elements (UP, VP, WP, UN, VN, and WN) shown in FIG. 2 at high speed, it was newly found out that such on-off switching has an influence on the increase in the chopping current level Ic.

That is, in the inverter circuit, a voltage changing in a pulsed form is superimposed on a voltage between the vacuum contacts along with the switching operation. As a result, an arc between the vacuum contacts becomes unstable, thereby generating chopping. In view of this, in the first embodiment of the present invention, the control unit 10A having a particular configuration is provided as shown in FIG. 1 so as to predict an unexpected operation of the contactor MMK in advance, thereby controlling the switching operation of the inverter INV.

As shown in FIG. 1, the control unit 10A is configured to include a determination unit (discrepancy determination unit) 40 as discrepancy determination means for determining a discrepancy between a switching operation of the contactor MMK and a switching command MKC; and a gate signal control unit 30 for controlling a gate signal. A basic gate signal GC, a basic contactor closing command (hereinafter, referred simply as a "closing command") MKC0, and a switching operation beforehand detection signal (hereinafter, referred simply as a "beforehand detection signal") MCO are inputted to the control unit 10A from an external system control unit (not shown in the figure) positioned at a higher level of the control unit 10A. Note that the determination unit 40 and the gate signal control unit 30 function as an inverter control unit 70 for performing on-off control for the plurality of switching elements.

Note that the basic gate signal GC is generated by the torque of the AC motor 6 in order to accelerate or decelerate the electric vehicle or by a method such as vector control in order to control the number of revolutions, and it is a signal to be an on-off command for switching elements included in the inverter INV. Moreover, the closing command MKC0 is similarly a signal inputted from the system control unit which is not shown in the figure and whose order is higher than the control unit 10A, and is a signal to be inputted to the control unit 10A in order to turn ON the contactor MMK when the AC motor 6 is in operation and to turn OFF the contactor MMK, for example, when the operation of the AC motor 6 is stopped or when the inverter INV has a failure.

Next, a detailed exemplary configuration and an operation of the control unit 10A containing the above-described determination unit 40 and gate signal control unit 30 will be described below.

Figure 10:
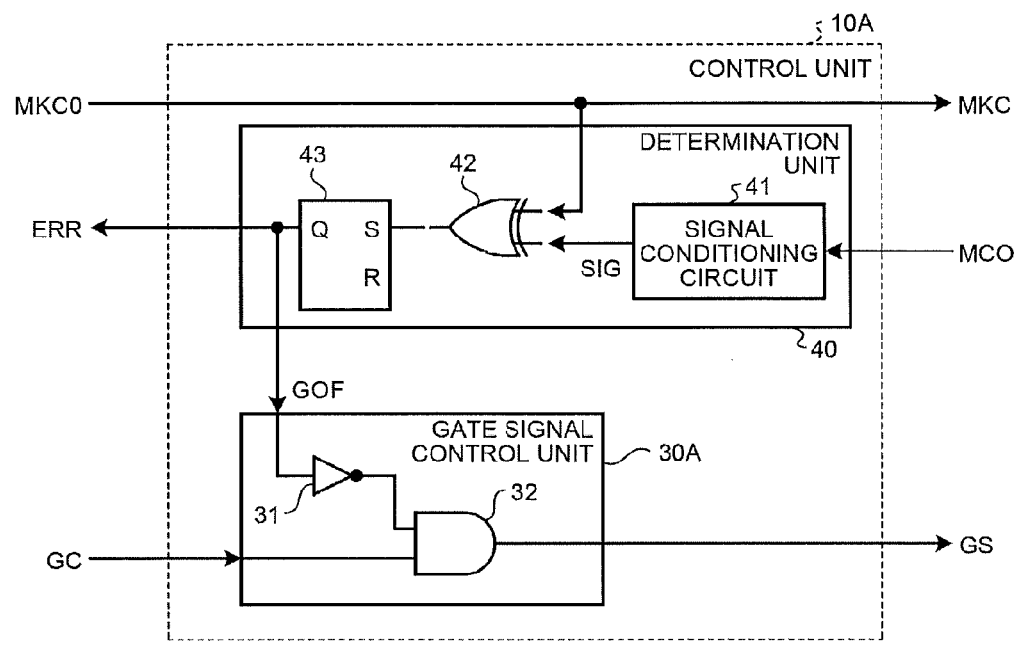
FIG. 10 is a diagram showing an exemplary configuration of a control unit in the first embodiment of the present invention.

FIG. 10 is a diagram showing an exemplary configuration of the control unit 10A in the first embodiment of the present invention. The control unit 10A is configured to include, as main components, the determination unit 40 and a gate signal control unit 30A.

First, the determination unit 40 will be described. The determination unit 40 is configured to include a signal conditioning circuit 41, an exclusive OR (XOR) circuit 42, and a latch circuit 43. The closing command MKC0 and the beforehand detection signal MCO of the contactor MMK are inputted to the determination unit 40. The beforehand detection signal MCO is converted by the signal conditioning circuit 41 to a voltage level (an H level or an L level) of the logic circuit to be outputted as a signal SIG. The exclusive OR output of the signal SIG and the closing command MKC0 is outputted as a signal GOF. The signal conditioning circuit 41 may be a typical limiter circuit or binary circuit. Since it is a generally well-known circuit, the detailed description thereof will be omitted.

An operation of the thus configured determination unit 40 will be described below. When the closing command MKC0 is at H (ON) and the signal SIG indicating the beforehand detection of the switching operation is at H (ON), no discrepancy occurs. Thus, the XOR output is L. Also when the closing command MKC0 and the signal SIG are both at L (OFF), no discrepancy occurs. Thus, the XOR output is L. However, if the signal SIG is turned to L (OFF) despite that the closing command MKC0 is at H, a discrepancy signal (H) is outputted from the XOR. As a result, the signal GOF held at the latch circuit 43 is turned to H and outputted to the gate signal control unit 30A. Needless to say, also if the closing command MKC0 is at L and the signal SIG is at H, the signal GOF outputs H. Note that once the signal GOF indicating a discrepancy is changed from L to H, a discrepancy signal is outputted as an error output ERR to a high-order system control unit.

Next, the gate signal control unit 30A will be described. The gate signal control unit 30A is configured to include a logic inverting circuit 31 and an AND circuit 32. The signal GOF and the basic gate signal GC are inputted to the gate signal control unit 30A, and the gate signal GS is outputted therefrom. An operation of the thus configured gate signal control unit 30A will be described below. When the signal GOF indicating a discrepancy is at L, the basic gate signal GC is outputted as it is to the inverter INV as the gate signal GS. However, if the signal GOF is changed from L to H, the gate signal GS is turned to L (OFF), thereby controlling the switching operations (on-off operations) of all of the switching elements in the inverter INV to an OFF state. Note that the basic gate signal GC and the gate signal GS can be regarded as representative examples of individual on-off signals for the elements UP to WN, or as signals for collectively controlling the on-off control of the elements UP to WN to an ON state or an OFF state.

Next, an operation according to the first embodiment will be described. For example, when the contactor MMK has some sort of failure, for example, when disconnection in the coil 60, a failure in a relay 52, loss of a control power source 51, or the like, is occurred, an excitation current to the coil 60 is lost. Thus, as shown in FIG. 4, an attractive force to the armature 61 is lost, thereby opening the main contacts in the contactor MMK.

Figure 7:
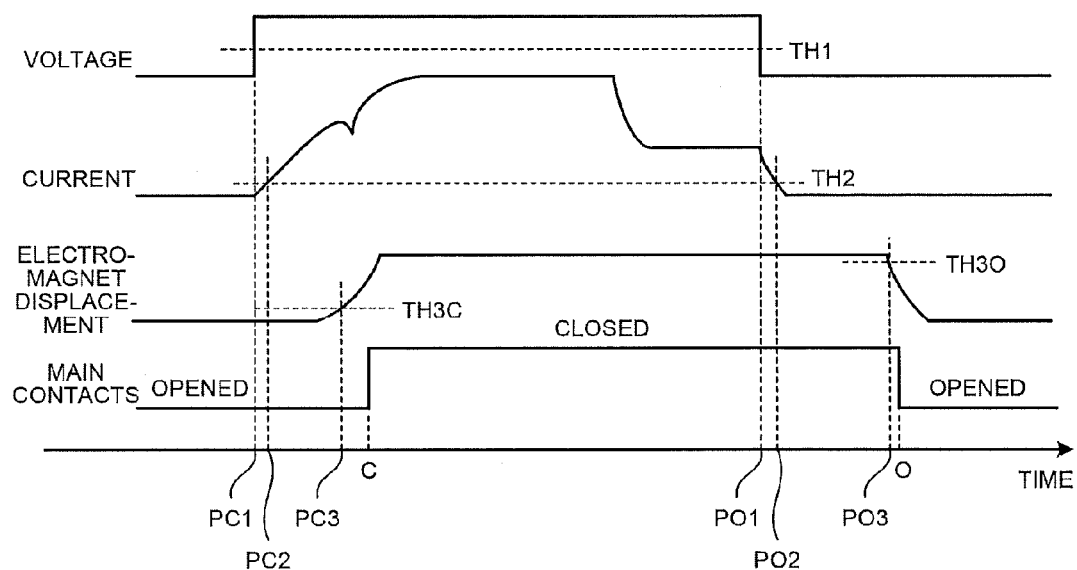
FIG. 7 is a chart for explaining closing and opening operations of the vacuum contactor as the motor opening contactor.

FIG. 7 is a chart for explaining closing and opening operations of the vacuum contactor as the contactor MMK. At time PC1, a voltage is applied to the operating coil, and an excitation current is supplied to the coil. The coil current is increased with a finite inclination due to an influence of the winding inductance. When a certain excitation current level is achieved, the operating electromagnet starts an attracting operation for the armature 61, and the main contacts in the contactor MMK are contacted with each other at time C. Next, if the control power source is lost at time PO1 due to some sort of failure, an applied voltage between the coils is reduced. As a result, the excitation current is lost and the electromagnet thereby performs an opening operation, resulting in the opening of the main contacts at time O.

Figure 8:
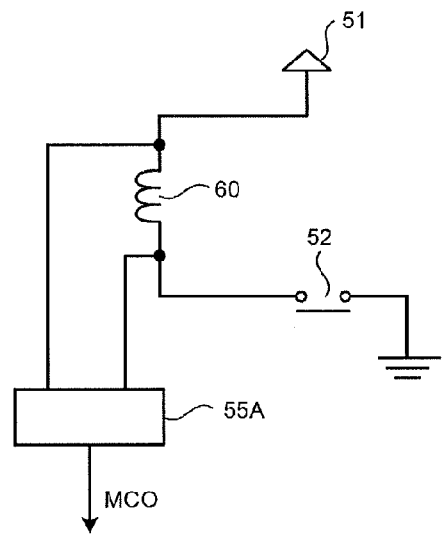
FIG. 8 shows an exemplary configuration of a switching operation beforehand detection unit for monitoring a potential difference in a coil shown in FIG. 3.
Figure 9:
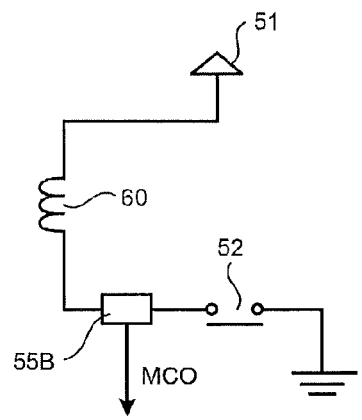
FIG. 9 shows an exemplary configuration of a switching operation beforehand detection unit for monitoring an excitation current in the coil shown in FIG. 3.

FIG. 8 shows an exemplary configuration of a switching operation beforehand detection unit for monitoring a potential difference in the coil shown in FIG. 3, and FIG. 9 shows an exemplary configuration of a switching operation beforehand detection unit for monitoring an excitation current in the coil shown in FIG. 3. In FIG. 8, the switching operation beforehand detection unit (hereinafter, referred simply as a "beforehand detection unit") 55A is a voltage-dividing circuit and is for performing conversion to a voltage level capable of being inputted to the control unit 10A. A typical control power source 51 is AC 100V or 110V, DC 100V, or the like. An input voltage to the control unit is 5 V, 12 V, or the like. Needless to say, the beforehand detection unit 55A may be integrated with another circuit such as the signal conditioning circuit 41 or a system to be included therein.

Here, as described above, if an opening operation is performed due to a failure despite that the closing command MKC0 has been outputted to the contactor MMK, a potential difference in the coil 60 is reduced. Thus, it is possible to detect an opening operation at time PO1 prior to time O at which the main contacts are opened. Since a voltage reduction is determined based on whether or not it is lower than a threshold voltage TH1 shown in FIG. 7, by appropriately selecting the threshold voltage TH1 in the signal conditioning circuit 41, it is possible to avoid a false detection due to a variation in the control voltage and to accurately detect an opening operation of the contactor MMK in advance.

A coil applied voltage signal (=switching operation beforehand detection signal) MCO detected at the beforehand detection unit 55A shown in FIG. 8 is subjected to a determination on a difference from the closing command MKC0 at the determination unit 40 shown in FIG. 1. If a difference between the coil applied voltage signal MCO and the closing command MKC0 is detected, the signal GOF for performing gate-off is outputted and delivered to the gate signal control unit 30.

Figure 11:
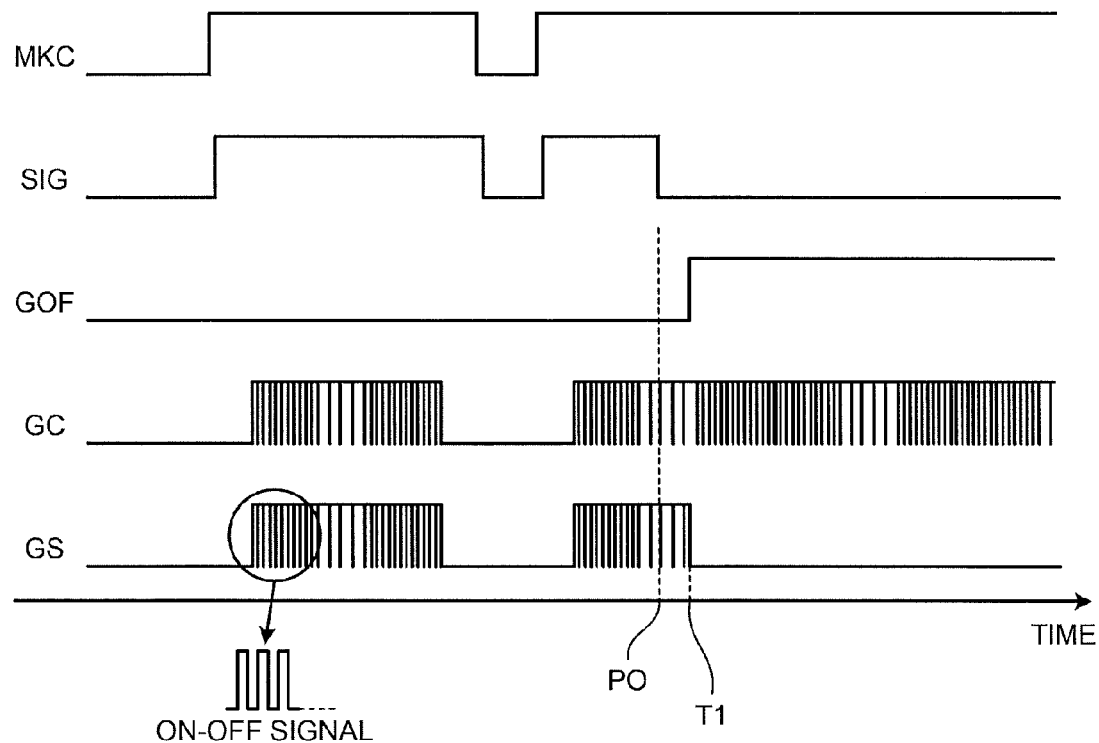
FIG. 11 is a time series chart showing operations in the first embodiment of the present invention.

FIG. 11 is a time series chart showing operations in the first embodiment of the present invention. As shown in FIG. 11, the signal SIG is turned to L at time PO, and the signal GOF indicating a command discrepancy is thereby turned to H at time T1 and inputted to the gate signal control unit 30. Then, the basic gate signal GC from the high-order control system is turned OFF, thereby controlling all of the switching elements in the inverter INV to an OFF state. Note that it is configured so that the operation up to this switching-off is completed before time O in FIG. 7. Since a time difference between time PO1 and time O is about 20 to 50 ms, it is a sufficient amount of time as the processing time. Therefore, by controlling the switching elements in the inverter INV to be OFF, the contactor MMK is opened in a state where a voltage changing in a pulsed form is not superimposed between the main contacts, thereby obtaining an advantageous effect such that the generation of a harmful opening surge involved with the chopping can be avoided.

While the voltage between both ends of the coil 60 in the contactor MMK is monitored in FIG. 8, the excitation current itself in the coil 60 may be monitored by a current detector 55B as the switching operation beforehand detection unit as shown in FIG. 9. Depending on control methods for an excitation current in the contactor MMK, there is a case where an excitation current is suppressed in a closing holding state in order to suppress a consumed power due to the excitation current in the closing holding state. In this case, as shown in FIG. 7, a threshold current TH2 may be set to be less than or equal to a holding current. In this case, it is possible to detect the opening operation of the opening contactor MMK in advance at time PO2. Note that since a typical time difference between time PO2 and time O is about 20 to 50 ms, it is a sufficient amount of time as the processing time.

Moreover, although FIG. 8 or FIG. 9 shows an example in which the operating circuit of the electromagnet coil 60 is monitored as the switching operation beforehand detection unit, a displacement in the electromagnet or the like (a core of the electromagnet or a mechanism part to be described below) may be monitored.

Figure 12:
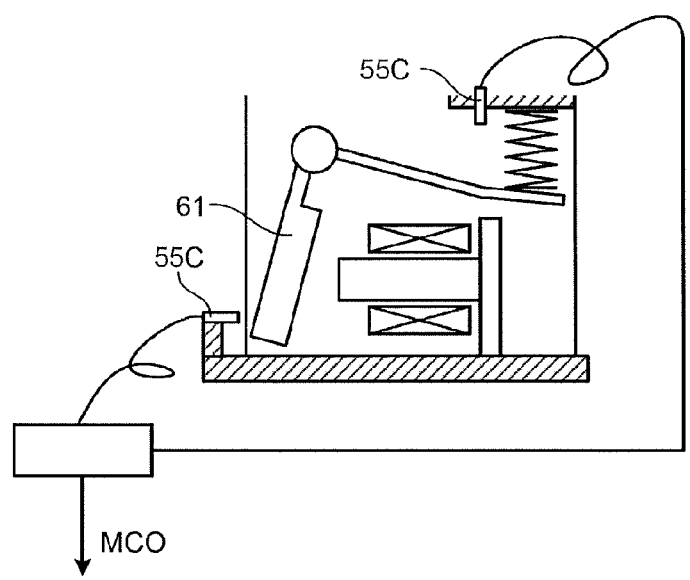

FIG. 12 shows an exemplary configuration of the switching operation beforehand detection unit for monitoring a displacement in the electromagnet or the like. FIG. 12 shows an enlarged electromagnet portion, and shows the armature 61 and a range sensor for detecting a displacement in a lever which is linked with the armature 61 and is not shown in the figure. Although an eddy current type close-range sensor 55C is herein shown as the switching operation beforehand detection unit, this close-range sensor 55C is for outputting the beforehand detection signal MCO only when the armature 61 is approached thereto and the lever is approached thereto. By adjusting the position of the sensor, as shown in FIG. 7, it is possible to detect a closing operation at time PC3 which is prior to time C at which the main contacts are closed if the threshold value is set in vicinity of the closed position TH3C in the electromagnet displacement. Moreover, if the threshold value is set at opened position vicinity TH3O in the electromagnet displacement, it is possible to detect an opening operation at time PO3 which is prior to time O at which the main contacts are opened. Needless to say, similar effects are obtained by using a generally-known stroke sensor of a type in which reflected light of a laser is read out with a triangulation method or a variable resistance stroke sensor mechanically connected with a motion part as a unit for detecting a displacement in the electromagnet or the like. Other means may be used.

Although beforehand detection regarding the opening operation of the main contacts has been described above, it is to be understood that the closing operation of the main contacts can be similarly worked with exactly the same way of thinking. As described above, the control unit 10A detects the switching operation of the motor opening contactor MMK prior to the switching (contact or detach) of the main contacts, and controls the inverter INV so as to prevent a voltage changing in a pulsed form from being superimposed between the main contacts of the motor opening contactor MMK at least at timing at which the motor opening contactor MMK cuts off or inputs a current to the AC motor 6.

Next, advantageous effects obtained with the above-described configuration will be described below. Typically, the contactor MMK is designed so as to be opened or closed in a no-voltage state where the inverter INV is being stopped. However, if the contactor MMK has some sort of failure, for example, when a disconnection in the coil 60, a failure in the relay 52, a loss of the control power source 51, or the like, is occurred, the contactor MMK is opened while the inverter INV is in operation. Before the main contacts (63 and 64) of the contactor MMK are opened, the AC motor drive control device 100 according to the first embodiment detects such opening in advance and controls all of the switching elements in the inverter INV to an OFF state. Thus, it is possible to avoid the generation of a harmful opening surge. If the inverter INV has a failure, since the inverter is being stopped, no harmful surge is generated even if the opening operation is performed. Therefore, since it is possible to avoid an adverse effect on the system due to the harmful surge, a highly-reliable AC motor drive control device can be obtained. Moreover, also in a case where the contactor MMK is falsely closed while the inverter INV is in operation, all of the switching elements in the inverter INV are controlled to an OFF state by detecting the closing operation of the contactor MMK in advance. Thus, no voltage changing in a pulsed form is superimposed between the main contacts, thereby being able to avoid the generation of the harmful closing surge involved with the chopping.

Moreover, according to the AC motor drive control device 100 in the first embodiment, since there is no need to dispose a number of ferrite cores and surge absorbers as in the conventional technique, it is possible to downsize the AC motor drive control device itself and reduce the weight thereof. Thus, there are obtained advantages such as a reduction in the manufacturing cost thereof and an improvement in the energy efficiency when an electric vehicle is running.

Second Embodiment

Figure 13:
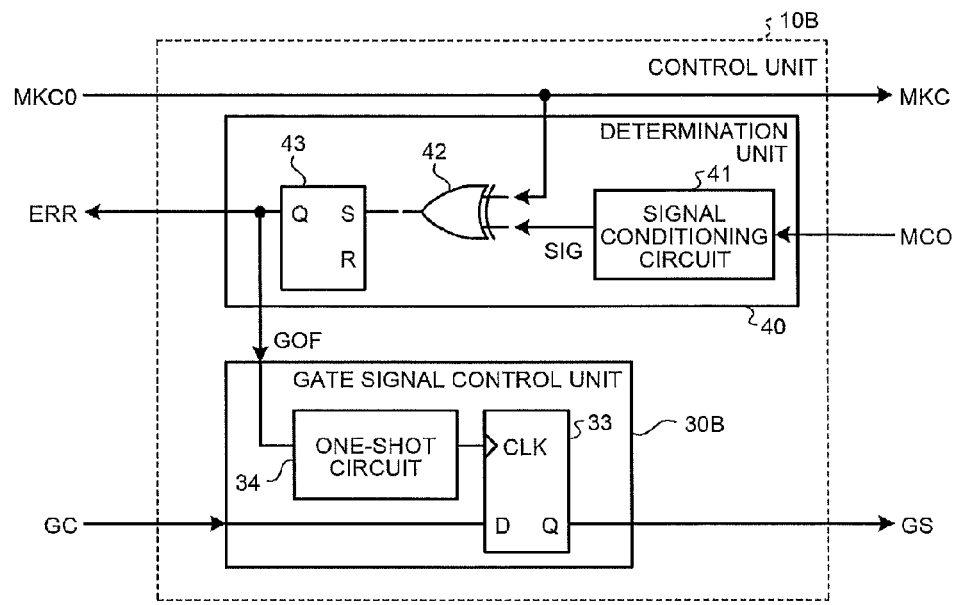
FIG. 13 is a diagram showing an exemplary configuration of a control unit in the second embodiment of the present invention.
Figure 14:
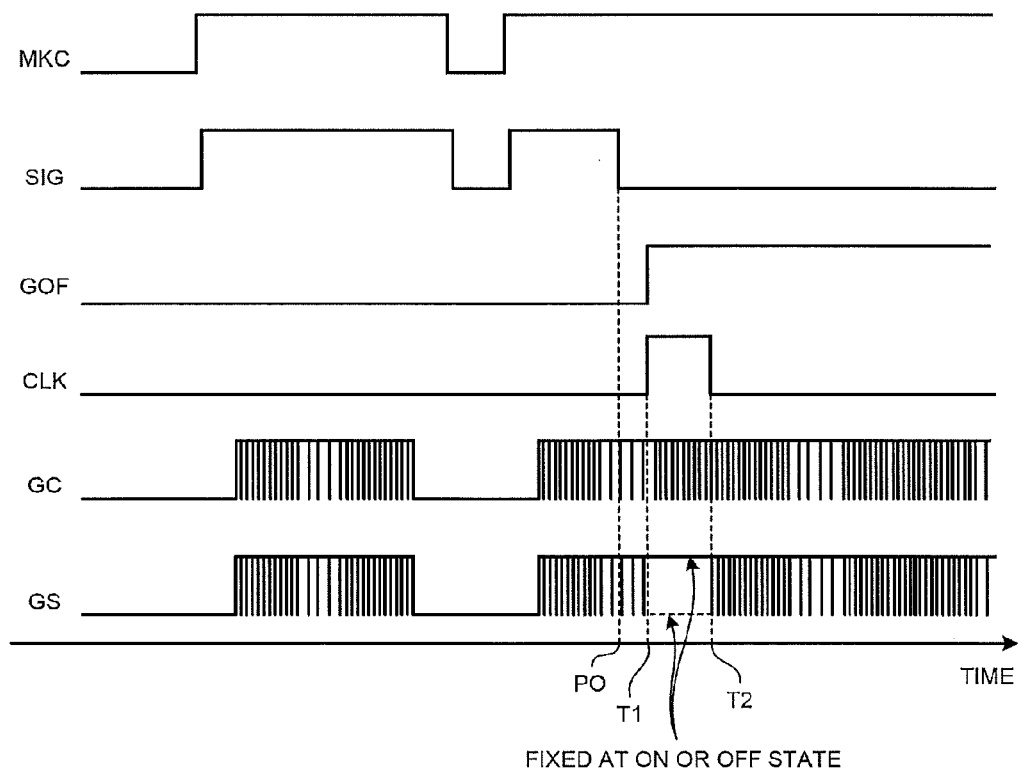
FIG. 14 is a time series chart showing operations in the second embodiment of the present invention.

FIG. 13 is a diagram showing an exemplary configuration of a control unit 10B in the second embodiment of the present invention, and FIG. 14 is a time series chart showing operations in the second embodiment of the present invention. As shown in FIG. 13, the configuration of the second embodiment is different from the first embodiment in the internal configuration of a gate signal control unit 30B. Only portions different from the first embodiment will be described below.

First, the configuration of the gate signal control unit 30B will be described. The gate signal control unit 30B is configured to include a one-shot circuit 34 and a D-type flip-flop circuit 33. The signal GOF outputted from the determination unit 40, which determines an operational discrepancy, is inputted to the one-shot circuit 34. The output of the one-shot circuit 34 and the basic gate signal GC inputted from a system control unit, which is not shown in the figure and whose order is higher than the control unit 10B, are inputted to the D-type flip-flop circuit 33.

An operation of the thus configured gate signal control unit 30B will be described below. The signal GOF, which is outputted from the determination unit 40 and which indicates a discrepancy, is inputted to the D-type flip-flop circuit 33 as a pulse waveform with a width of a certain period of time set in advance by the one-shot circuit 34. Thus, after the signal GOF indicating a discrepancy is turned to H from L, the gate signal GS maintaining the state of the basic gate signal GC (in a case of H, H is maintained; and in a case of L, L is maintained) is outputted during the certain period of time set in the one-shot circuit.

For example, as shown in FIG. 14, when the basic gate signal GC is a PWM-modulated gate signal, if the signal SIG is turned to L at time PO, PWM modulation is masked during a period from time T1 to time T2, thereby controlling the switching of each of the switching elements (UP, VP, WP, UN, VN, and WN) to be continuously kept at ON (or OFF). The mask time determined in the one-shot circuit 34 is preferably set to be longer than a period of time covering up to the contact or detach of the main contacts in the contactor MMK, and it is preferably about 50 to 150 ms. Note that among the functions of the control units 10A and 10B shown in the first and second embodiments, the determination unit 40 may be contained in the contactor MMK, and there is no limit in terms of the installation position thereof.

Next, an advantageous effect obtained with the above-described configuration will be described below. When the contactor MMK is falsely operated due to some sort of reason while the inverter INV is in operation, before the switching (contact or detach) of the main contacts (63 and 64) of the contactor MMK, the AC motor drive control device 100 in the second embodiment detects such switching in advance and controls the switching of each of the switching elements (UP, VP, WP, UN, VN, and WN) in the inverter INV to be continuously kept at ON (or OFF). Thus, a voltage between the main contacts is kept constant, and no voltage changing in a pulsed form is superimposed between the main contacts. Therefore, it is possible to avoid the generation of a harmful switching surge involved with the chopping of the contactor MMK.

Moreover, according to the AC motor drive control device 100 in the second embodiment, since there is no need to dispose a number of ferrite cores and surge absorbers as in the conventional technique, it is possible to downsize the AC motor drive control device itself and reduce the weight thereof. Thus, there is obtained an advantage of an improvement in the energy efficiency when an electric vehicle is running.

Third Embodiment

If an ON state or OFF state in the switching operation is temporarily maintained as shown in the second embodiment, a voltage asynchronous with the rotation of the motor is applied to the AC motor, resulting in a possibility of causing overcurrent or a torque shock. In view of this, according to the third embodiment, an inverter control unit 70 controls, during a period between time T1 and time T2, the switching state of the inverter INV to a zero-voltage vector state (a state in which a set of the upper arm side switching elements UP, VP, and WP is all turned ON, and a set of the lower arm side UN, VN, and WN is all turned OFF, or the inverse state thereof). Note that it is preferable to control all of the switching elements to be OFF after time T2.

With the above-described configuration, it is possible to obtain not only the same advantageous effects as those in the second embodiment but also an advantageous effect of suppressing a torque shock or overcurrent since the voltage applied to the AC motor during a period between time T1 and time T2 can be made zero.

Note that each of the configurations shown in the first to third embodiments is merely an embodiment for carrying out the present invention, and changes can be made by omitting a part of the constituent elements or by adding other known elements. For example, the present invention can be practiced without providing the determination unit 40. Specifically, it is only necessary to include an inverter control unit for controlling the switching elements in the inverter INV, in a case where the switching (contact or detach) of the main contacts is predicted, based on the main contact beforehand detection signals MCO from the beforehand detection units 55A to 55C so as to prevent a voltage changing in a pulsed form from being superimposed between the main contacts of the contactor MMK at least at timing at which the motor side switching unit cuts off a current to the AC motor.

INDUSTRIAL APPLICABILITY

As described above, the present invention can be applied to an AC motor drive control device equipped in electric vehicles, and the present invention is particularly useful as an invention capable of avoiding the generation of a harmful switching surge involved with the switching of a motor opening contactor.

REFERENCE SIGNS LIST

1 Power Collector
2 Rail
3 Wheel
6 AC Motor
10A, 10B Control Unit
30, 30A, 30B Gate Signal Control Unit
31 Logic Inverting Circuit
32 AND Circuit
33 D-Type Flip-Flop Circuit
34 One-Shot Circuit
40 Determination Unit (Discrepancy Determination Unit)
41 Signal Conditioning Circuit
42 Exclusive or (XOR) Circuit
43 Latch Circuit
51 Control Power Source
52 Relay
55A, 55B, 55C Switching Operation Beforehand Detection Unit
60 Coil of Opening Contractor
61 Armature
62 Vacuum Interrupter
63 Fixed Contact
64 Moving Contact
65 Opening Spring
70 Inverter Control Unit
100 Drive Control Device
200 MMK Operating Unit
ERR Error Output
FC Capacitor
GC Basic Gate Signal
GOF Signal Indicating A Discrepancy
GS Gate Signal
Ic Chopping Current Level
INV Inverter
LB Power Source Opening Contactor
MCO Switching Operation Beforehand Detection Signal, Coil Applied Voltage Signal
MKC Switching Command
MKC0 Basic Contactor Closing Command
MMK Motor Opening Contactor
N Negative Side Conductor
P Positive Side Conductor
SIG Signal Indicating The Beforehand Detection Of The Switching Operation
TH1 Threshold Voltage
TH2 Threshold Current
TH3C Closed Position Vicinity
TH3O Opened Position Vicinity
UI Inverter Side U-Phase Conductor
UM Motor Side U-Phase Conductor
UN U-Phase Lower Arm Element
UP U-Phase Upper Arm Element
VI Inverter Side V-Phase Conductor
VM Motor Side V-Phase Conductor
VN V-Phase Lower Arm Element
VP V-Phase Upper Arm Element
WI Inverter Side W-Phase Conductor
WM Motor Side W-Phase Conductor
WM W-Phase Lower Arm Element
WP W-Phase Upper Arm Element

The invention claimed is:
1. An AC motor drive control device comprising:
an inverter, including a plurality of switching elements subjected to on-off control, for converting a DC voltage to an AC voltage with a desired frequency to drive an AC motor;
a motor side switching unit connected between the inverter and the AC motor;

a switching operation beforehand detection unit for detecting a switching operation of the motor side switching unit prior to contact or detach of main contacts and outputting a switching operation beforehand detection signal; and a control unit for performing the on-off control for the plurality of switching elements and outputting a gate signal for setting all of the switching elements in the inverter to an OFF state based on the switching operation beforehand detection signal.

2. An AC motor drive control device comprising:

an inverter, including a plurality of switching elements subjected to on-off control, for converting a DC voltage to an AC voltage with a desired frequency to drive an AC motor;

a motor side switching unit connected between the inverter and the AC motor;

a switching operation beforehand detection unit for detecting a switching operation of the motor side switching unit prior to contact or detach of main contacts and outputting a switching operation beforehand detection signal; and a control unit for performing the on-off control for the plurality of switching elements, the control unit having a discrepancy determination unit for determining a difference between the switching operation beforehand detection signal and a switching command of the motor side switching unit, wherein the control unit controls the inverter when a discrepancy is determined at the discrepancy determination unit.

3. An AC motor drive control device comprising:

an inverter, including a plurality of switching elements subjected to on-off control, for converting a DC voltage to an AC voltage with a desired frequency to drive an AC motor;

a motor side switching unit connected between the inverter and the AC motor and having a vacuum contact;

a switching operation beforehand detection unit for detecting a switching operation of the motor side switching unit prior to contact or detach of main contacts and outputting a switching operation beforehand detection signal; and a control unit for performing the on-off control for the plurality of switching elements, controlling the inverter so as to prevent a voltage changing in a pulsed form from being superimposed between the main contacts of the motor side switching unit based on the switching operation beforehand detection signal, and controlling all of the plurality of switching elements to an OFF state after passage of a predetermined period of time.

4. An AC motor drive control device comprising:

an inverter, including a plurality of switching elements subjected to on-off control, for converting a DC voltage to an AC voltage with a desired frequency to drive an AC motor;

a motor side switching unit connected between the inverter and the AC motor;

a switching operation beforehand detection unit for detecting a switching operation of the motor side switching unit prior to contact or detach of main contacts based on a voltage applied to an operating electromagnet for operating switching of a movable contact in the motor side switching unit, an excitation current in the operating electromagnet, or a displaced amount of a movable unit in the motor side switching unit, and outputting a switching operation beforehand detection signal; and a control unit having an inverter control unit for performing the on-off control for the plurality of switching elements and controlling the inverter based on the switching operation beforehand detection signal.

5. The AC motor drive control device according to claim 1, wherein the inverter control unit controls the inverter so as to prevent a voltage changing in a pulsed form from being superimposed between the main contacts of the motor side switching unit at least at timing at which the motor side switching unit cuts off or inputs a current to the AC motor.

6. The AC motor drive control device according to claim 2, wherein the inverter control unit controls the inverter so as to prevent a voltage changing in a pulsed form from being superimposed between the main contacts of the motor side switching unit at least at timing at which the motor side switching unit cuts off or inputs a current to the AC motor.

7. The AC motor drive control device according to claim 4, wherein the inverter control unit controls the inverter so as to prevent a voltage changing in a pulsed form from being superimposed between the main contacts of the motor side switching unit at least at timing at which the motor side switching unit cuts off or inputs a current to the AC motor.

8. The AC motor drive control device according to claim 1, wherein the inverter control unit
includes a discrepancy determination unit for determining a difference between the switching operation beforehand detection signal and a switching command of the motor side switching unit, and
controls the inverter when a discrepancy is determined by the discrepancy determination unit.

9. The AC motor drive control device according to claim 2, wherein the inverter control unit
includes a discrepancy determination unit for determining a difference between the switching operation beforehand detection signal and a switching command of the motor side switching unit, and
controls the inverter when a discrepancy is determined by the discrepancy determination unit.

10. The AC motor drive control device according to claim 3, wherein the inverter control unit
includes a discrepancy determination unit for determining a difference between the switching operation beforehand detection signal and a switching command of the motor side switching unit, and
controls the inverter when a discrepancy is determined by the discrepancy determination unit.

11. The AC motor drive control device according to claim 4, wherein the inverter control unit
includes a discrepancy determination unit for determining a difference between the switching operation beforehand detection signal and a switching command of the motor side switching unit, and
controls the inverter when a discrepancy is determined by the discrepancy determination unit.

12. The AC motor drive control device according to claim 1, wherein the control unit includes a discrepancy determination unit for determining a difference between the switching operation beforehand detection signal and a switching command of the motor side switching unit.

13. The AC motor drive control device according to claim 2, wherein the inverter control unit outputs a gate signal for turning all of the switching elements in the inverter to an OFF state based on the switching operation beforehand detection signal.

14. The AC motor drive control device according to claim 1, wherein the inverter control unit outputs a gate signal holding switching of the switching elements in the inverter at a predetermined state based on the switching operation beforehand detection signal.

15. The AC motor drive control device according to claim 2, wherein the inverter control unit outputs a gate signal holding switching of the switching elements in the inverter at a predetermined state based on the switching operation beforehand detection signal.

16. The AC motor drive control device according to claim 1, wherein the inverter control unit outputs a gate signal for setting an output of the inverter in a zero-voltage vector state based on the switching operation beforehand detection signal.

17. The AC motor drive control device according to claim 1, wherein the switching operation beforehand detection unit detects the switching operation of the motor side switching unit from a voltage applied to an operating electromagnet for operating switching of a movable contact in the motor side switching unit.

18. The AC motor drive control device according to claim 1, wherein the switching operation beforehand detection unit detects the switching operation of the motor side switching unit from an excitation current of an operating electromagnet for operating switching of a movable contact in the motor side switching unit.

19. The AC motor drive control device according to claim 1, wherein the switching operation beforehand detection unit detects the switching operation of the motor side switching unit from a displacement amount in a movable unit in the motor side switching unit.

20. The AC motor drive control device according to claim 2, wherein the switching operation beforehand detection unit detects the switching operation of the motor side switching unit from a displacement amount in a movable unit in the motor side switching unit.

* * * * *